(12) United States Patent
Martineau

(10) Patent No.: US 12,613,160 B2
(45) Date of Patent: Apr. 28, 2026

(54) DEVICE FOR MEASURING THE PERFORMANCE OF AN OPTICAL DETECTOR, AND ASSOCIATED MEASURING METHOD

(71) Applicant: LYNRED, Palaiseau (FR)

(72) Inventor: Lilian Martineau, Veurey Voroize (FR)

(73) Assignee: LYNRED, Palaiseau (FR)

( * ) Notice: Subject to any disclaimer, the term of this patent is extended or adjusted under 35 U.S.C. 154(b) by 203 days.

(21) Appl. No.: 18/693,767

(22) PCT Filed: Oct. 5, 2022

(86) PCT No.: PCT/FR2022/051879
§ 371 (c)(1),
(2) Date: Mar. 20, 2024

(87) PCT Pub. No.: WO2023/073296
PCT Pub. Date: May 4, 2023

(65) Prior Publication Data
US 2024/0385073 A1 Nov. 21, 2024

(30) Foreign Application Priority Data
Oct. 29, 2021 (FR) ...................................... 2111515

(51) Int. Cl.
*G01M 11/02* (2006.01)
*G01J 1/02* (2006.01)
(Continued)

(52) U.S. Cl.
CPC ....... *G01M 11/0214* (2013.01); *G01J 1/0252* (2013.01); *G01J 1/04* (2013.01);
(Continued)

(58) Field of Classification Search
CPC .......... G01M 11/0214; G01M 11/335; G01M 11/00; G01J 1/04; G01J 1/08;
(Continued)

(56) References Cited

U.S. PATENT DOCUMENTS

| | | | |
|---|---|---|---|
| 2013/0327929 A1* | 12/2013 | Ohkubo | G01J 1/42 |
| | | | 362/241 |
| 2015/0021477 A1* | 1/2015 | Cassaigne | C22C 19/07 |
| | | | 250/338.1 |

FOREIGN PATENT DOCUMENTS

| | | | | |
|---|---|---|---|---|
| DE | 10048447 B4 * | 5/2006 | ............ | G01M 11/00 |

OTHER PUBLICATIONS

International Search Report and Written Opinion, corresponding International Application No. PCT/FR2022/051879, mailing date Feb. 6, 2023.
(Continued)

*Primary Examiner* — Georgia Y Epps
*Assistant Examiner* — Erin R Garber
(74) *Attorney, Agent, or Firm* — MARSHALL, GERSTEIN & BORUN LLP

(57) ABSTRACT

A device for measuring the performance of an optical detector includes a cryostat, a holder capable of receiving the detector, secured to the inside of the cryostat, and means for measuring the performance of the detector. It also includes a screen arranged around the holder capable of limiting the radiation likely to reach the holder in a wavelength range of the detector, and a single-mode optical fiber in the wavelength range of the detector, inserted in an opening of the cryostat. The device further comprises at least one luminous flux generation module that incorporates a fibered source capable of generating the luminous flux in the optical fiber.

10 Claims, 10 Drawing Sheets

(51) Int. Cl.

| | |
|---|---|
| *G01J 1/04* | (2006.01) |
| *G01J 1/08* | (2006.01) |
| *G01J 5/02* | (2022.01) |
| *G01J 5/04* | (2006.01) |
| *G01J 5/061* | (2022.01) |
| *G01J 5/90* | (2022.01) |
| *G01M 11/00* | (2006.01) |

(52) U.S. Cl.
CPC .............. *G01J 1/0425* (2013.01); *G01J 1/08* (2013.01); *G01J 5/0205* (2013.01); *G01J 5/045* (2013.01); *G01J 5/061* (2013.01); *G01J 5/90* (2022.01); *G01M 11/335* (2013.01); *G01J 2001/0481* (2013.01)

(58) Field of Classification Search
CPC ............ G01J 2001/0481; G01J 1/0252; G01J 1/0407; G01J 1/0425; G01J 2001/083; G01J 5/045; G01J 5/061; G01J 5/0821; G01J 5/0865; G01J 5/90; G01J 5/0205; G01J 5/0896

See application file for complete search history.

(56) References Cited

OTHER PUBLICATIONS

Chorier, Philippe et al., "*Sofradir latest developments for infrared space detectors*", Infrared Technology and Applications, SPIE, 1000 20th St. Bellingham, WA 98225-6705 USA, vol. 8012, No. 1, May 13, 2011 (May 13, 2011), pp. 1-12, XP060016814, DOI: 10.1117/12.885243, chapitre 2.2; figures 2.1-2.7.

Pidancier, Patricia, et al., "*Sofradir in space: an overview on the activity and on the main programs*", Sensors, Systems, and Next-Generation Satellites XV, SPIE, 1000 20th St. Bellingham, WA 98225-6705 USA, vol. 8176, No. 1, Oct. 6, 2011 (Oct. 6, 2011), pp. 1-11, XP060020155, DOI: 10.1117/12.899040 chapitre 3.2.

SPIE, PO Box 10 Bellingham WA 98227-0010 USA, Jan. 1, 2088 (Jan. 1, 2088), XP040443630, le document en entier.

Crouzet, P-E, et al.: "*Impact of proton radiation on the Ariel AIRS CH1 Hawaii-1RG MWIR detector*", SPIE Proceedings; [Proceedings of SPIE ISSN 0277-786X], SPIE, US, vol. 11454, Dec. 15, 2020 (Dec. 15, 2020), DOI: 10.1117/12.2561267 ISBN: 978-1-5106-3673-6 figure 2.

Jain, Ankur et al: "*Design, development, characterization and qualification of infrared focal plane area array detectors for space-borne imaging applications*", Proceedings of SPIE; [Proceedings of SPIE ISSN 0277-786X vol. 10524], SPIE, vol. 9881, May 2, 2016 (May 2, 2016), pp. 988114-988114, XP060069591, DOI: 10.1117/12.2222994, ISBN: 978-1-5106-1533-5, figure 8.

Dantes, Didler: "*Characterization of infrared detectos for space applications*", Algorithms and Technologies for Multispectral, Hyperspectral, and Ultraspectral Imagery XIX—Proceedings of SPIE, vol. 2894, Sep. 25, 1996 (Sep. 25, 1996), pp. 180-186, XP055924977, US, ISSN: 0277-786x, DOI: 10.1117/12/252078, ISBN: 978-1-5106-4548-6.

Ankur, Jain et al.: "*Development of electro-optical characterization test bench for high performance infrared focal plane area array dectectors*", Physicas and Technology of Sensors (ISPTS), 2012 1st International Symposium on, IEEE, Mar. 7, 2012 (Mar. 7, 2012), pp. 220-223, XP032217370, DOI: 10.1109/ISPTS.2012.6260928, ISBN: 978-1-4673-1040-6, Chapitre III Test Bench Configuration.

Wilinsky, Walter V.: "*Modular approach to focal plane array testing*", Algorithms and Technologies for Multispectral, Hyperspectral, and Ultraspectral Imagery XIX—Proceedings of SPIE, vol. 2474, May 30, 1995 (May 30, 1995), pp. 254-264, XP055925036, US, ISSN: 0277-786x, DOI: 10.1117/12.210560, ISBN: 978-1-5106-4548-6.

* cited by examiner

State of the art

State of the art

State of the art

State of the art

20  108
107  112
313  111
311

300

State of the art

320

321

322

323

324

325

State of the art

State of the art

State of the art

<u>10</u>

<u>10</u>

<u>10</u>

<u>10</u>

DEVICE FOR MEASURING THE PERFORMANCE OF AN OPTICAL DETECTOR, AND ASSOCIATED MEASURING METHOD

DOMAIN OF THE INVENTION

The present invention concerns a device for measuring the performance of an optical detector as well as the associated measurement method. More specifically, the invention concerns detectors implementing quantum phenomena operating at low temperature, the detector having to be cooled at very low temperatures, typically in the range from 50 to 200 K.

The invention is intended to be applied to measure the performance of a detector in the visible range, in near infrared, that is, having a wavelength in the range from 1 to 2.5 micrometers (also called SWIR for "Short-Wavelength InfraRed"), in medium infrared, having a wavelength in the range from 3 to 8 micrometers (also called MWIR for "Mid-Wavelength InfraRed"), and in far infrared, having a wavelength in the range from 8 to 14 micrometers (also called LWIR for "Long-Wavelength InfraRed").

Thus, the invention may be applied to a large number of detectors and for a large number of distinct ranges. More particularly, the invention aims at providing highly accurate measurements, for example to characterize the performance of a detector intended for highly demanding applications, such as applications in the space field.

BACKGROUND

To characterize the performance of a quantum-type detector, particularly before it is placed onboard a satellite, a plurality of different measurements may be carried out, such as:

radiometric measurement;

remanence measurement;

dark current measurement; and spectral response measurement.

Radiometric measurement aims at measuring the output level response of the detector according to the flux of incident photons on detector 20. For this purpose, as illustrated in FIG. 1a, a radiometric test bench 100 conventionally comprises a light source 101 enabling to obtain a quasi-black body emission law with an emission peak around 1 micrometer.

Typically, this light source 101 may have an optical power of a few tens of Watts with a color temperature of approximately 2,700 Kelvin. In the sense of the invention, the "color temperature" characterizes a light source by comparison with an ideal material emitting light only by the effect of heat. Such a light source 101 conventionally comprises windings forming a resistor. However, the light L11 generated by this type of light source 101 is highly inhomogeneous and it is possible to observe, in far field, light variations due to the shape of the windings of the resistor of light source 101.

To correct this defect, an integrating sphere 102 is used at the output of light source 101 to obtain a more homogeneous luminous flux L12. More precisely, this integrating sphere 102 is powered by light source 101 through an adjustable iris 103. Indeed, adjustable iris 103 enables to adjust the quantity of photons while keeping a constant current for light source 101, in order to guarantee the stability of said light source 101. Further, adjustable iris 103 does not modify the distribution of the rays at the output of integrating sphere 102.

To control the quantity of photons penetrating into integrating sphere 102, a reference detector 104 is placed on integrating sphere 102 to measure the quantity of photons present in integrating sphere 102. A controller 110 controls the power of light source 101 and the aperture rate of iris 103 according to the quantity of photons searched for and measured by reference detector 104.

The luminous flux L12 at the output of integrating sphere 102 penetrates into a thermalized enclosure 105 having its inner walls intended to absorb the radiation in the wavelength range of interest. This thermalized enclosure 105 integrates screens 106 enabling to limit the viewing angle of detector 20. More precisely, stray luminous fluxes are captured by screens 106 and are absorbed on the walls of thermalized enclosure 105 so that only the luminous flux directly transmitted by integrating sphere 102 reaches detector 20.

The thermalization of thermalized enclosure 105 enables to limit the emission capacity of the walls. For example, the enclosure can be maintained at a 12° C. temperature while the room temperature is substantially 22° C.

Thus, the luminous flux L13 at the output of thermalized enclosure 105 directly reaches detector 20. Detector 20 is embedded in a cryostat 107 intended to replicate the operating conditions of detector 20. For example, for space applications, detector 20 may operate under vacuum with cryogenic temperatures.

More precisely, the vacuum level in cryostat 107 may be of $10^{-5}$ mbars while the temperature of cryostat 107 may be close to 180 K for a short-wavelength infrared detector, between 150 K and 110 K for a mid-wavelength infrared detector, and between 60 K and 100 K for a long-wavelength infrared detector.

To limit the propagation of luminous flux L13 within cryostat 107, a screen 112 may also be placed around detector 20. For this radiometric test bench 100, screen 112 is opened to receive luminous flux L13.

Given the pressure and temperature differences between cryostat 107 and thermalized enclosure 105, cryostat 107 is insulated from thermalized enclosure 105. Luminous flux L13 penetrates into cryostat 107 through an optical window 111. Between optical window 111 and screen 112, the cryostat conventionally comprises a filter specifically sized to only let through the wavelength range used by detector 20.

Further, a detector 20 conventionally comprises an assembly of sensitive elements or pixels. It is conventionally desired to measure the output level of these sensitive elements according to the flux of incident photons. For this purpose, detector 20 is assembled on a mobile holder 108 by means of a displacement member 109 in order to adjust the central point P10 of reception of luminous flux L13 so that this central point P10 is placed at the center of detector 20 before performing the measurement of the output level of detector 20.

To perform the radiometric measurement, an operator starts by assembling detector 20 on the mobile holder 108 of cryostat 107, at a first step 120 illustrated in FIG. 1b. It then controls the placing under vacuum of cryostat 107, during a second step 121.

Given the high desired vacuum level, this placing under vacuum of cryostat 107 is particularly long and conventionally lasts for between 4 and 8 hours, during which period frequent controls of the pressure and of the temperature have to be performed. When the desired vacuum level has been reached, cryostat 107 is cooled to the desired temperature, at a third step 122. This third step 122 of cooling of cryostat 107 generally lasts for between 1 and 3 hours.

When these steps of preparation of cryostat 107 have been completed, the operator performs the different radiometric measurements for the different sensitive elements, at a step 123.

For this purpose, it controls the displacement of mobile holder 108 in order to adjust the central point P10 of reception of luminous flux L13 so that this central point P10 is placed at the center of detector 20. The measurement of the output level of sensitive elements P10 is then performed for a plurality of photon quantities, by varying the aperture of iris 103.

Thus, measurements are performed one after the other to measure the output level of all the sensitive elements of detector 20. Typically, these measurements altogether require approximately one day of manipulations for an operator.

At the end of the measurements, the temperature has to be progressively and slowly increased so that cryostat 107 returns to the room temperature, at a step 124. To protect the physical integrity of the detector, this step 124 requires approximately one day of manipulations during which frequent controls of the pressure and of the temperature have to be performed. The last step 125 comprises raising the vacuum level before being able to remove cryostat 107 from radiometric test bench 100. On the whole, steps 120 to 125 altogether require approximately one week of manipulations for an operator.

Before or after the performance of detector 20 is obtained on radiometric test bench 100, this detector 20 can be analyzed on another test bench, for example a remanence test bench 200, such as illustrated in FIG. 2a. For this purpose, cryostat 107 is disassembled from radiometric test bench 100 to be placed in remanence test bench 200.

Prior to the installation of cryostat 107 integrating detector 20 on remanence test bench 200, the filter assembled on the screen 112 of cryostat 107 may be modified.

The remanence measurement aims at observing the effects of time variations of a scene on the images of a detector. For this purpose, it is investigated whether an image previously captured by a detector influences the image being read (remanence effect) and, for detectors performing an integration during the reading, whether the image being integrated by the detector influences the image being read (pre-remanence effect).

To perform this measurement, it is necessary to use a light source 201 having a light intensity having a controlled time variation. Thus, light source 201 is associated with a mechanical shutter 202 capable of closing the output of light source 201 with a response time in the order of one millisecond.

Light source 201 may be identical to the light source 101 of radiometric test bench 100.

To perform the remanence measurement, an operator starts by assembling cryostat 107 on remanence test bench 200, at a first step 220 illustrated in FIG. 2b. They then control the placing under vacuum of cryostat 107, at a second step 221, and the cooling of cryostat 107, at a third step 222.

When these steps of preparation of cryostat 107 have been completed, the operator performs the different remanence measurements, at a step 223. For this purpose, they control the acquisition of a plurality of successive images modified during the shutting times of shutter 202, and they compare the acquired images with reference images to detect pre-remanence or remanence effects on the acquired images. The remanence effect appears when an acquired image exhibits artifacts linked to the influence of the previous image while the pre-remanence effect appears, for detectors performing an integration during the reading, when an image being read exhibits artifacts linked to the influence of the image being integrated (acquisition in IWR, "Integrate While Read", mode).

In the same way as for radiometric test bench 100, when the remanence measurements have been completed, the operator controls the increase of the temperature of cryostat 107, at a step 224, and the pressure rise, at a step 225. On the whole, steps 220 to 225 altogether require a few days of manipulations for an operator.

Before or after the performance of detector 20 is obtained on remanence test bench 200, this detector 20 may be analyzed on a dark current test bench 300, such as illustrated in FIG. 3a. For this purpose, cryostat 107 is disassembled from remanence test bench 200 to be placed on dark current bench 300.

The darkness measurement or the dark current measurement aims at measuring the dark current of detector 20, that is, the leakage current of components integrated in detector 20 without the presence of a flux. The dark current level influences the detector performance. Indeed, the higher the dark current, the higher the number of defective pixels, and the more the dark current noise impacts the general noise of detector 20.

Thus, the dark current measurement partly sets the operating temperature of detector 20. To measure the dark current, the current inherent to the flux originating from the test bench has to be negligible with respect to the dark current to be measured.

It is thus also important to vary the temperature during this measurement to ensure that, precisely, the measured dark current is not formed of a background flux.

For this purpose, prior to the installation of cryostat 107 integrating detector 20 on dark current bench 300, the filter is disassembled from the screen 112 of cryostat 107 to be replaced with a shutter 313 in order to insulate detector 20. Further, optical window 111 may also be covered with an opaque cover 311 to further insulate detector 20.

These two luminous insulation levels enable to measure the leakage current of the sensitive elements of detector 20 by varying the temperature of cryostat 107.

For this purpose, as illustrated in FIG. 3b, an operator also has to assemble detector 20 in cryostat 107, at a first step 320, and then to control the placing under vacuum of cryostat 107, at a second step 321, and the cooling of cryostat 107, at a third step 322. After having performed the measurements of the leakage current of each sensitive element, at a step 323, the operator controls the increase of the temperature of cryostat 107, at a step 324, and the pressure rise, at a step 325. On the whole, steps 320 to 325 altogether still require approximately one week of manipulations for an operator.

The last test bench aims at obtaining the spectral response of detector 20. The measurement of the spectral response enables to obtain the wavelength response of the pixels of detector 20. Indeed, whatever the technology used, the response of detector 20 is not homogeneous according to the wavelength. It may depend on many technological parameters.

It is often necessary to know the spectral response, particularly when optical filters are desired to be used in front of detector 20. Thus, it is possible to anticipate whether certain wavelengths are to be filtered or not according to the desired application.

To perform the spectral response measurement, the wavelength of a monochromous luminous flux L42 has to be varied and the ratio of the response of detector 20 to the response of a reference detector 404 having a known spectral response has to be measured.

For this purpose, as illustrated in FIG. 4*a*, spectral response test bench 400 conventionally comprises a light source 401 having its luminous flux wavelength-modulated by a controller 410. Light source 401 may be identical to the light source 101 of radiometric test bench 100.

The luminous flux L41 generated by light source 401 is transmitted to a diffraction grating 414 enabling to obtain a monochromous luminous flux L42. Monochromous luminous flux L42 is then processed by a filter 415, to eliminate the influence of higher orders of diffraction grating 414, before being inserted in an integrating sphere 402. This integrating sphere 402 enables to generate a luminous flux for reference detector 404 as well as a luminous flux L44 for detector 20. For this purpose, the cryostat 107 of the detector comprises a screen 112 which is open and an optical window 111, also open. A filter may possibly be assembled on screen 112.

To use spectral response test bench 400, an operator further has to assemble detector 20 in cryostat 107, at a first step 420, and then control the placing under vacuum of cryostat 107, at a second step 421, and the cooling of cryostat 107, at a third step 422, as illustrated in FIG. 4*b*. After having performed the spectral response measurements, at a step 423, the operator controls the increase of the temperature of cryostat 107, at a step 424, and the pressure rise, at a step 425. On the whole, steps 420 to 425 altogether still approximately require one week of manipulations for an operator.

Thus, to fully characterize a detector 20, cryostat 107 is transported between benches 100, 200, 300, and 400, and one or a plurality of operators have to carry out all the steps 120-125, 220-225, 320-325, and 420-425. The full characterization of a detector 20 thus currently requires approximately one month of work for an operator.

Further, these different test benches 100, 200, 300, and 400 also have a significant bulk.

The technical problem of the invention thus is to characterize a detector with a plurality of distinct measurements, such as radiometric measurement, remanence measurement, dark current measurement, and spectral response measurement, more simply and more rapidly.

SUMMARY

To address this technical problem, the invention provides a single test bench enabling to perform the different measurements without displacing the detector. For this purpose, the detector is placed in a cryostat having a single-mode optical fiber, intended to transmit a light beam in front of the detector, penetrating into it.

The single-mode optical fiber comprises two ends: a first end placed inside of the cryostat, and a second end placed outside of the cryostat and to which a plurality of luminous flux generation modules that incorporate a fibered source may be connected to perform a plurality of distinct measurements, such as radiometric measurement, remanence measurement, dark current measurement, and spectral response measurement.

For this purpose, according to a first aspect, the invention concerns a device for measuring the performance of an optical detector, comprising:

a cryostat comprising means for placing it under vacuum and cooling it, capable of placing the detector in anticipated operating conditions;

means for measuring the detector performance;

a holder capable of receiving the detector, secured to the inside of the cryostat; and a screen arranged around the holder to limit radiation capable of reaching the holder in a wavelength range of the detector.

The invention is characterized in that the measurement device also comprises:

a single-mode optical fiber in the operating wavelength range of the detector, said optical fiber being inserted into an opening of the cryostat, and comprising:

a first end secured to an opening of the screen, to project a luminous flux onto all or part of the detector; and a second end, external to the cryostat, intended to receive a luminous flux; and at least two luminous flux generation modules that incorporate a fibered source capable of generating the luminous flux in the second end of the optical fiber;

the means for measuring the detector performance being capable of measuring said performance according to the luminous flux received on the second end, where a plurality of distinct measurements may be performed by interchanging the module connected on the second end.

In the sense of the invention, a "fibered source" is a source having its generated light beam coupled with a mode of the optical fiber associated with the source. This fibered source may be a light-emitting diode, a super-continuum source, or a laser, for example. A supercontinuum source is obtained by directing a laser beam onto a material having non-linear optical transmission properties so that the running of the laser beam through the material modifies the spectrum of the laser beam.

By fibered source, there is meant the coupling of a light source with an optical fiber; the luminous flux originating from the primary source is guided inside of the optical fiber and all the way to the fiber output. The coupling between the source and the fiber may be performed by alignment of the two components and/or by means of intermediate component(s) (lens, prism . . . ).

The invention thus enables to perform a plurality of measurements without displacing the detector within the cryostat, and without requiring repeatedly placing it under vacuum, by modifying the luminous flux injected into the optical fiber by means of the module for generating said luminous flux. As a result, it is no longer necessary to carry out a large number of phases of pressure rise/decrease and of temperature rise/decrease since the cryostat can remain on the same test bench and in the same state during luminous flux changes.

The present invention thus comprises replacing the bulky elements of radiometric measurement and spectral response test benches, that is, the light sources and the integrating spheres, with a module that incorporates a fibered source and a single-mode optical fiber.

Indeed, the luminous flux generated by a fibered source, for example a light-emitting diode, conventionally has a lower power than light sources of the state of the art as well as an inhomogeneous spatial distribution due to its structure. It would be possible to use an integrating sphere to perform a homogenization. However, the use of an integrating sphere causes a significant power loss and it would then be difficult to obtain the desired power levels.

To solve this problem, the invention provides using a single-mode optical fiber, which spatially filters the luminous flux originating from the fibered source and allows a homogeneous divergence at its output, for example in the form of a Gaussian beam, without losing luminous power.

Thus, the single-mode character of the optical fiber enables to correct inhomogeneities, so that at the output of the single-mode optical fiber, the luminous flux transmitted onto the detector is equivalent to luminous fluxes used in the state of the art.

As known, the single-mode character of the optical fiber is obtained by selecting the step index (NA) and the diameter (a) of the core of the optical fiber so that the normalized frequency (V) is in the order of from 1 to 2.405, according to the following relation:

$$V = \frac{2\pi a NA}{\lambda}$$

with $\lambda$ corresponding the wavelength of interest of the detector.

In the sense of the invention, a "single-mode" optical fiber is an optical fiber having a normalized frequency (V) in the range from 1.2 to 3.8 in the wavelength range of interest. Indeed, in this normalized frequency range, the most part of the wavelength range has a single-mode behavior and the optical fiber is very little subject to the coupling of external luminous fluxes. Thus, the optical fiber provides an efficient insulation from outer disturbances.

The use of an optical fiber also has other advantages.

Indeed, the optical fiber may also be selected to have an optical sheath capable of very efficiently filtering outer radiation and of favoring the transmission of the luminous flux in the wavelength range of interest of the detector. Thus, for applications in mid-wavelength or long-wavelength infrared, an optical fiber with a silica core is not optimal due to the absorption of silica.

Preferably, the optical fiber is formed with a core made of fluorinated glass, and for example of Zblan, of chalcogenide, or of a polycrystalline material, such as silver chloride or silver bromide. Zblan draws its name from the elements contained in the fluorinated glass, especially zirconium, barium, lanthanum, aluminum, and sodium, and it has a high performance for applications in mid-wavelength infrared, having a wavelength in the range from 3 to 8 micrometers. Chalcogenide glass optical fibers have a wide transparency domain in infrared and significant non-linear optical properties. Thus, chalcogenide glass optical fibers are adapted for applications in mid-wavelength infrared and long-wavelength infrared. Optical fibers with a core made of a polycrystalline material are widely developed; they thus have a relatively low cost and enable to ensure the homogeneity of the light beam transmitted to the detector in all infrared ranges.

Further, the optical fiber may be integrated in the cryostat with a very small opening to limiting the risk of temperature or pressure loss.

Further, the use of an optical fiber enables to use integrated optical functions originating from telecommunications.

Thus, to perform the radiometric measurement, one of the luminous flux generation modules, intended to be connected on the second end of the optical fiber, comprises:

a fibered source intended to generate a luminous flux inside of a first feeder optical fiber;

an optical attenuator, capable of limiting the luminous flux, connected between the first feeder optical fiber and a second feeder optical fiber;

an optical splitter, connected to the second feeder optical fiber, capable of splitting the luminous flux of the second feeder optical fiber onto a third and a fourth feeder optical fibers; the third feeder optical fiber being connected on the second end of the optical fiber inserted in the cryostat; and a reference detector connected to the fourth feeder optical fiber, capable of measuring the luminous flux at the output of the optical splitter in order to control the power of the fibered source and of the optical attenuator to obtain an anticipated measurement luminous power.

As a result, by limitingly implementing low-bulk optical elements, it is possible to perform a radiometric measurement as efficient as radiometric measurements carried out on radiometric test benches of the state of the art.

To perform a remanence measurement, one of the luminous flux generation modules, intended to be connected on the second end of the optical fiber, comprises:

a fibered source intended to generate a luminous flux inside of a first feeder optical fiber;

an optical shutter capable of blocking the luminous flux, said shutter being connected between the first feeder optical fiber and a second feeder optical fiber;

an optical splitter connected to the second feeder optical fiber, capable of splitting the luminous flux of the second feeder optical fiber onto a third and a fourth feeder optical fiber; the third feeder optical fiber being connected on the second end of the optical fiber inserted in the cryostat; and a reference detector connected to the fourth feeder optical fiber, capable of controlling the luminous flux at the output of the optical splitter.

Conversely to a conventional remanence test bench, this embodiment enables to use an optical or acousto-optical shutter instead of a mechanical shutter. Now, an optical or acousto-optical shutter exhibits a response time in the order of one microsecond, while a mechanical shutter for example has a response time in the order of one millisecond. The remanence measurement can thus be more accurate.

Further, the luminous flux generation module then implemented may be used to perform a measurement of the dark current by cutting off the power supply of the fibered source. Indeed, by using an optical fiber with a normalized frequency (V) in the range from 1.5 to 3 in the wavelength range of interest, the wavelengths of the luminous fluxes of ambient lights cannot be coupled with the optical fiber. Thus, it is not necessary to use a cover.

To perform a spectral response measurement, one of the luminous flux generation modules, intended to be connected on the second end of the optical fiber, comprises:

a fibered source intended to generate a luminous flux inside of a first feeder optical fiber;

a diffraction grating connected to the first feeder optical fiber;

a filter connected to the output of the diffraction grating; and a second feeder optical fiber connected to the output of the second filter.

Thus, the radiometric measurement, the remanence measurement, the dark current measurement, and the spectral response measurement can be carried out by fibered sources connected to the optical fiber inserted in the cryostat so that it is not necessary to displace the detector between two measurements.

It is thus sufficient to change the operating mode and/or the luminous flux generation module to pass from one measurement to the other, without having to modify the vacuum level or the temperature of the cryostat. The device thus enables to perform all the required measurements in simplified fashion.

Thus, according to a second aspect, the invention concerns a method of measuring the performance of an optical detector by means of a measurement device of the type of that previously described. This method comprises the following steps:

assembly of the detector having its performance desired to be measured on the cryostat holder;

placing of the cryostat under vacuum to reach a desired operating vacuum level for the detector;

cooling of the cryostat to reach a desired operating temperature of the detector;

connection of a first luminous flux generation module on the second end of the optical fiber;

measurement of the detector performance;

disconnection of the first module from the second end of the optical fiber;

connection of a second luminous flux generation module on the second end of the optical fiber;

measurement of the detector performance;

heating of the cryostat to reach the room temperature; and placing back under ambient pressure of the cryostat and disassembly of the detector.

Preferably, four distinct measurements are performed, so that the method comprises the following steps:

connection of a first luminous flux generation module to perform a radiometric measurement on the second end of the optical fiber;

radiometric measurement of the detector;

disconnection of the first luminous flux generation module from the second end of the optical fiber;

connection of a second luminous flux generation module to perform a remanence measurement on the second end of the optical fiber;

measurement of the remanence of the detector;

measurement of the dark current of the detector;

disconnection of the second luminous flux generation module from the second end of the optical fiber;

connection of a third luminous flux generation module to perform a spectral response measurement on the second end of the optical fiber; and measurement of the spectral response of the detector.

BRIEF DESCRIPTION OF THE DRAWINGS

The invention will be well understood on reading of the following description, the details of which are given as an example only, and developed in relation with the appended drawings, where identical references relate to identical elements:

FIG. 1a is a simplified representation of a radiometric test bench of the state of the art;

FIG. 1b illustrates the steps of implementation of a radiometric measurement based on the bench of FIG. 1a;

FIG. 2b illustrates the steps of implementation of a remanence measurement based on the bench of FIG. 2a;

FIG. 3b illustrates the steps of implementation of a dark current measurement based on the bench of FIG. 3a;

FIG. 4a is a simplified representation of a spectral test bench of the state of the art;

FIG. 4b illustrates the steps of implementation of a spectral measurement based on the bench of FIG. 4a;

FIG. 12 illustrates the variation of the luminous flux at the output of an integrating sphere in the radiometric test bench of the state of the art of FIG. 1a;

FIG. 13 illustrates the variation of the luminous flux at the input of an optical window in the radiometric test bench of the state of the art of FIG. 1a;

FIG. 14 illustrates the variation of the luminous flux on the detector in the radiometric test bench of the state of the art of FIG. 1a.

DETAILED DESCRIPTION

Figure 5:
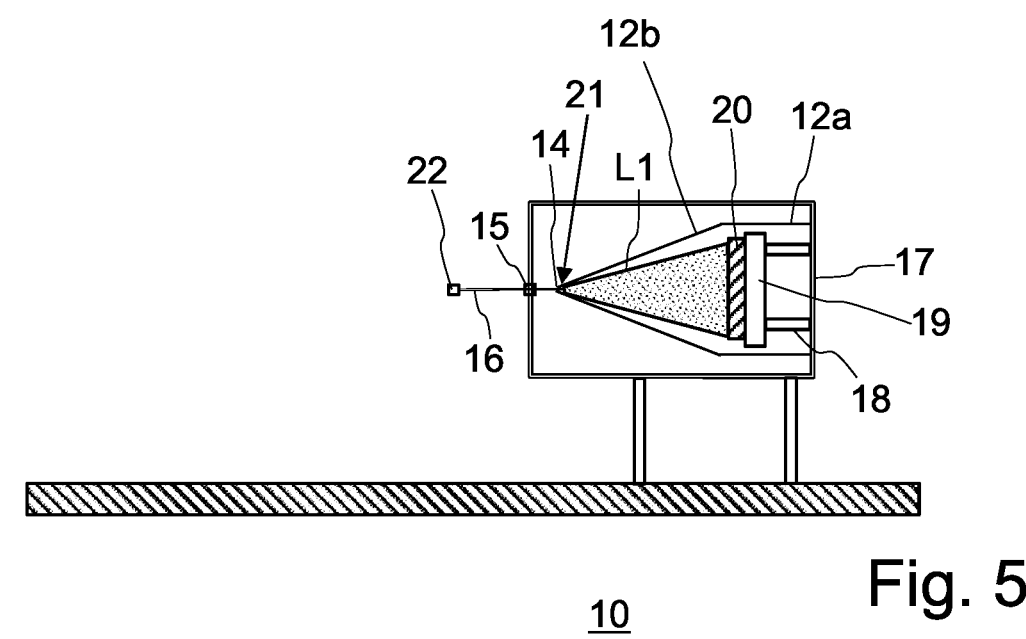
FIG. 5 is a simplified representation of a device for measuring the performance of an optical detector according to an embodiment of the invention.

As illustrated in FIG. 5, the invention aims at a test device 10 enabling to characterize the performance of an optical detector 20. For this purpose, optical detector 20 is assembled in a cryostat 17 by means of a holder 19. Holder 19 may be formed of a plate intended to receive an electronic circuit having detector 20 assembled thereon. Thus, holder 19 may receive electric power supply connectors for the electronic circuit of assembly of detector 20.

This holder 19 is coupled to an inner wall of cryostat 17 by means of legs 18. Typically, four legs 18 are arranged at the four angles of a holder plate 19. To convey the electric power supply and information return signals of detector 20, cryostat 17 is conventionally crossed by a set of connectors, not shown in FIG. 5. Thus, when detector 20 is assembled to holder 19, the latter can be powered and controlled similarly to its operation in the conditions anticipated during the use of detector 20.

For example, detector 20 may be intended for space applications where detector 20 operates at a very low temperature and at very high vacuum levels. Thus, the cryostat comprises means for placing it under vacuum and cooling it, enabling to place detector 20 in its anticipated operating conditions.

The devices of power supply and of measurement of the detector performance are conventionally arranged outside of cryostat 17, as well as the means for cooling and placing cryostat 17 under vacuum.

Around detector 20, cryostat 17 comprises a screen intended to limit the radiation capable of reaching holder 19 in the wavelength range of detector 20. In the example of FIG. 5, the screen is formed in two parts. A parallelepipedal or cylindrical part 12*a* is attached to an inner wall of cryostat 17 or to holder 19. More particularly, the parallelepipedal or cylindrical part 12*a* of the screen extends above the height of holder 19 with respect to the inner wall of the cryostat having legs 18 attached thereto. Above this first parallelepipedal or cylindrical part 12*a*, a second pyramidal or conical part 12*b* is placed above detector 20. At the top of this pyramidal or conical part 12*b,* the screen has an opening receiving a first end 14 of an optical fiber 16. This optical fiber 16 also runs through an opening 15 of the cryostat, arranged in front of the opening of the pyramidal or conical part 12*b* of the screen.

Of course, the shape of the screen may vary without changing the invention. For example, the screen may comprise a first cylindrical portion topped with a tapered portion or any other shape enabling to form an opening of small dimension in front of detector 20. Indeed, the invention gives two distinct roles to the screen of cryostat 17:

a first role of blocking of undesired luminous fluxes present in cryostat 17; and a second role of positioning of the first end 14 of optical fiber 16 in front of detector 20.

Indeed, the first end 14 of optical fiber 16 has to be arranged in such a way that the luminous flux coming out of this first end 14 mainly covers the focal plane of detector 20. For this purpose, the cryostat dimensions have to be adapted to the guiding needs of this first end 14 of optical fiber 16. For example, the volume of cryostat 17 may be in the range from 250 cm³ to 1,000 cm³. Thereby, the volume of cryostat 17 may be three times larger than that of a cryostat of the state of the art, and this volume depends on the type of optical fiber 16 used and on its numerical aperture at the level of first end 14. The numerical aperture characterizes the acceptance cone at the input of the fiber and the propagation cone at the output of the fiber. For example, the numerical aperture of optical fiber 16 may be selected between 0.1 and 0.4 in single mode.

Preferably, the materials of the inner wall of cryostat 17, of screen 12*a* and 12*b,* of holder 19, and of legs 18 are selected to limit the desorption of molecules when detector 20 is placed under vacuum. Similarly, the opening 15 of cryostat 17 is preferably adapted to the diameter of optical fiber 16, to limit the incorporation of stray luminous fluxes in cryostat 17.

More particularly, optical fiber 16 is a mainly single-mode optical fiber in the wavelength range of detector 20. This single-mode character of optical fiber 16 indicates that the optical fiber preferably has a normalized frequency in the range from 1.2 to 3.8 in the wavelength range of interest. For example, the optical fiber may be formed with a core made of Zblan, of chalcogenide glass, or of a polycrystalline material. Further, optical fiber 16 may be covered with a sheath especially selected to limit the risk of transmission of stray luminous fluxes to detector 20, for example an acrylate sheath. The sheath may also be formed based on the same material as optical fiber 16, this material is then associated with dopants enabling to define the transmission window and thus the spectral band over which optical fiber 16 may be used.

By using an optical fiber with a normalized frequency in the range from 1.2 to 3.8 in the wavelength range of interest of detector 20, optical fiber 16 is particularly resistant to the integration of external stray fluxes from one of its ends, since these stray fluxes have wavelengths clearly distinct from the wavelengths capable of being coupled with optical fiber 16. Further, the sheath limits the risk of integration of stray fluxes outside of the ends of optical fiber 16.

To transmit a luminous flux inside of optical fiber 16, a second end 22 of optical fiber 16 is intended to receive a luminous flux from a fibered source 23, 33, 43.

This fibered source is preferably integrated in a luminous flux generation module used according to the measurement desired. Thus, detector 20 may be assembled in cryostat 17 and the second end 22 of the optical fiber may receive luminous flux generation modules according to the measurements desired.

This fibered source intended to transmit the luminous flux in the second end 22 of optical fiber 16 is for example formed of a light-emitting diode, of a supercontinuum source, or of a laser source.

Figure 6:
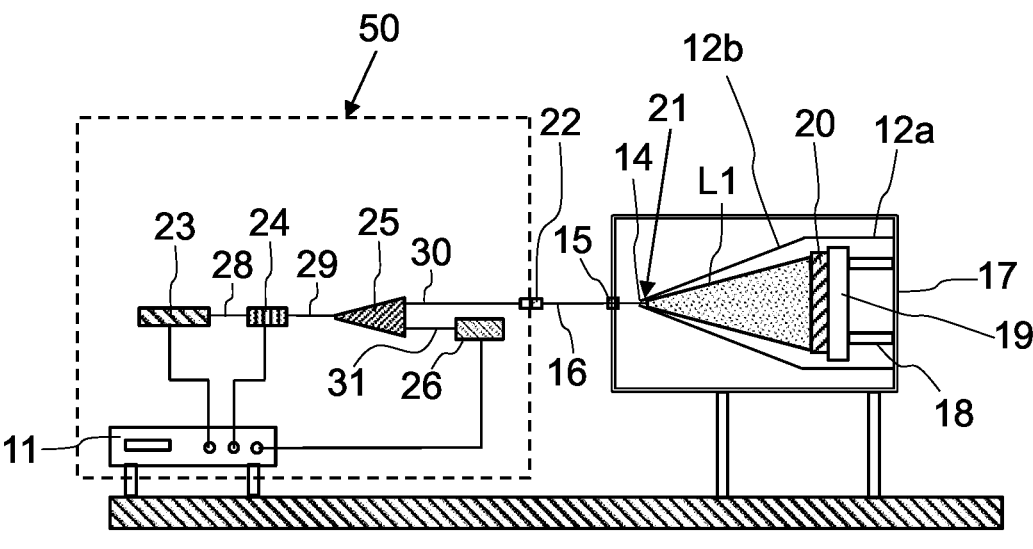
FIG. 6 schematically illustrates a configuration of the measurement device of FIG. 5 to obtain a radiometric measurement.
Figure 7:
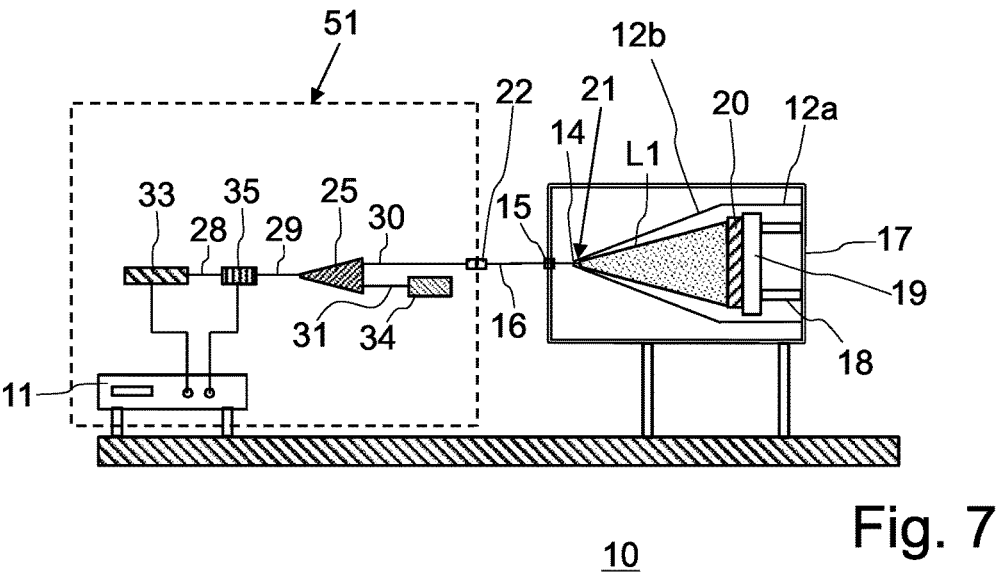
FIG. 7 illustrates a configuration of the measurement device of FIG. 5 to obtain a remanence measurement.

When a radiometric measurement is desired to be performed, as illustrated in FIG. 6, luminous flux generation module 50 for example comprises a fibered source 23 connected to a first feeder optical fiber 28. this feeder optical fiber is connected to an optical attenuator 24 enabling to limit the luminous flux transmitted over the first feeder optical fiber 28. At the output of attenuator 24, a second feeder optical fiber 29 is implemented to transmit the luminous flux at the output of optical attenuator 24 to an optical splitter 25. This optical splitter 25 comprises two outputs: a first output connected to a third feeder optical fiber 30, itself connected on the second end 22 of optical fiber 16; and a fourth feeder optical fiber 31 connected to a reference detector 26.

A controller 11 controls the power of fibered source 23 and the attenuation rate of optical attenuator 24 according to the desired quantity of photons measured by reference detector 26.

Figure 9:
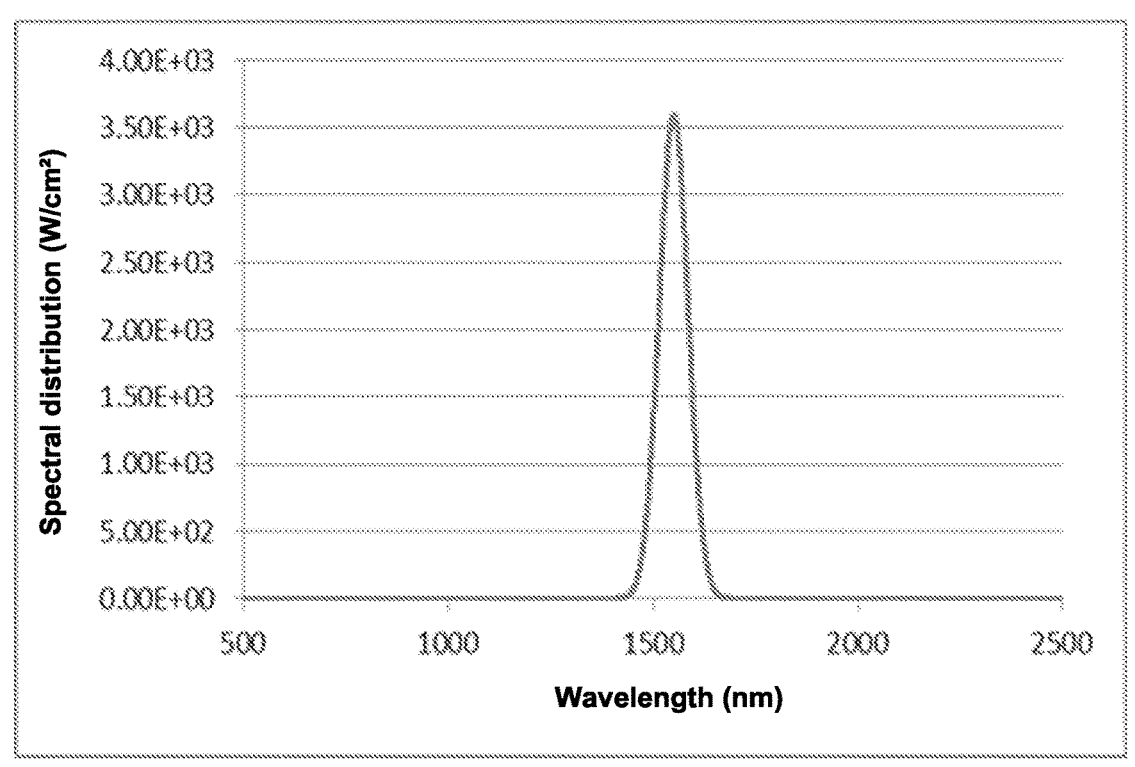
FIG. 9 illustrates the variation of the luminous flux at the output of a fibered source in the configuration of FIG. 6.

At the output of fibered source 23, the spectral distribution of the luminous flux generated in optical fiber 23 is illustrated in FIG. 9. In FIGS. 9 to 14, the spectral distribution of the luminous flux at the fiber output is shown in W/cm² versus the wavelength in nanometers. This spectral distribution may be measured by a device of spectroradiometer type. Further, this spectral distribution of the luminous flux at the fiber output is also known under the terms "spectral density of the energy flux".

In the example of FIG. 9, the use of fibered source 23 and of optical fiber 28 already enables to obtain a luminous flux particularly centered in the wavelength range of interest and having a very acceptable luminous power.

Figure 10:
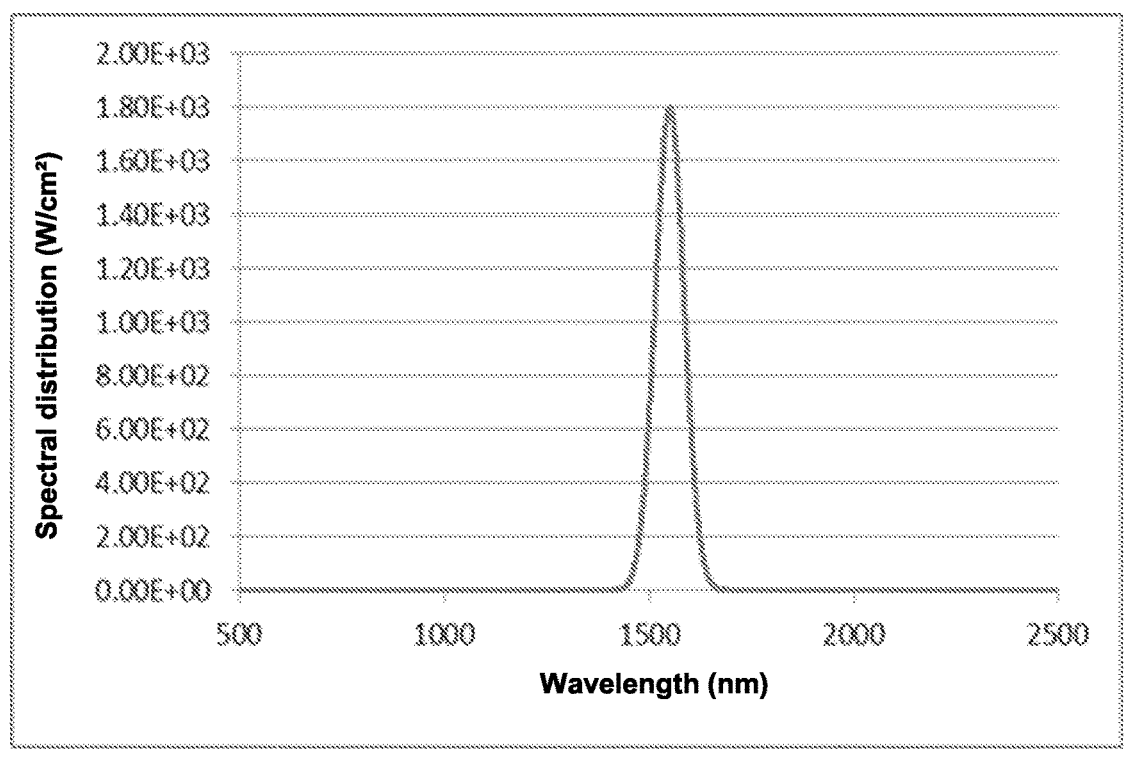
FIG. 10 illustrates the variation of the luminous flux at the output of an optical fiber inserted in a cryostat in the configuration of FIG. 6.
Figure 11:
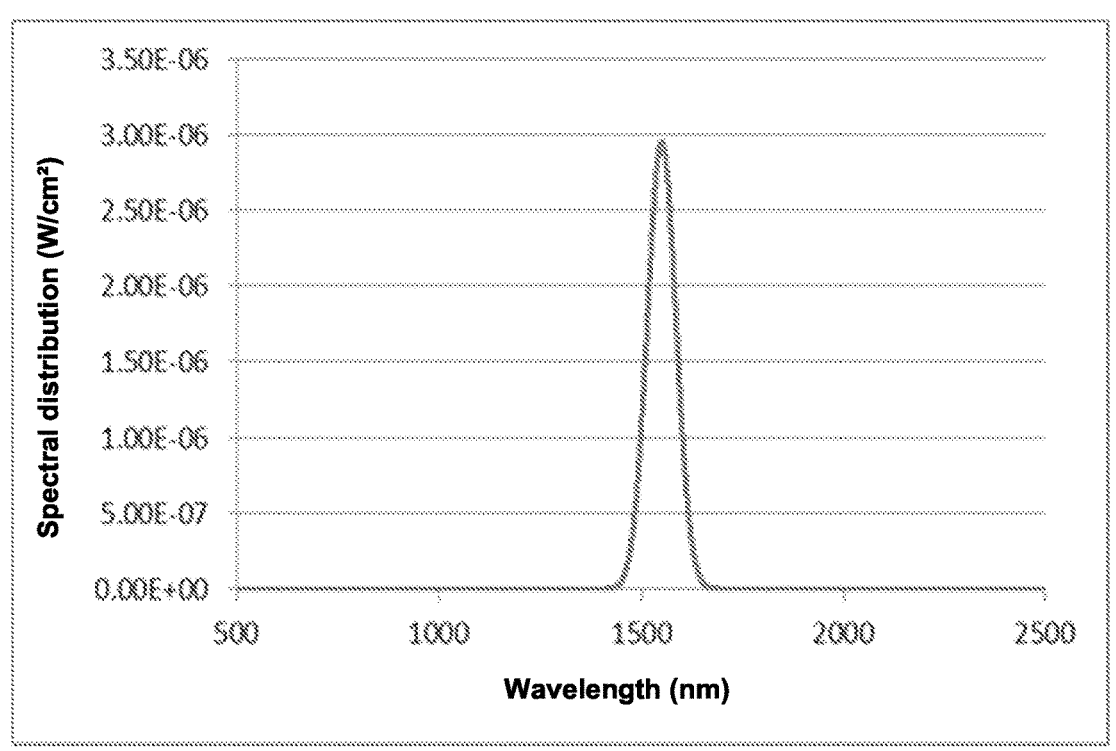
FIG. 11 illustrates the variation of the luminous flux on the detector in the configuration of FIG. 6.

After having crossed the optical attenuator, the luminous flux L1 at the output of optical fiber 16 at cryostat 17 is illustrated in FIG. 10. It can be observed that this luminous flux L1 has kept its spectral width but has a decreased light intensity. After the propagation of this luminous flux L1 within the cryostat, the luminous flux measured at detector 20 is illustrated in FIG. 11. Once again, the luminous flux measured at detector 20 has kept a very accurate spectral width and has simply lost part of its luminous power.

Figure 12:
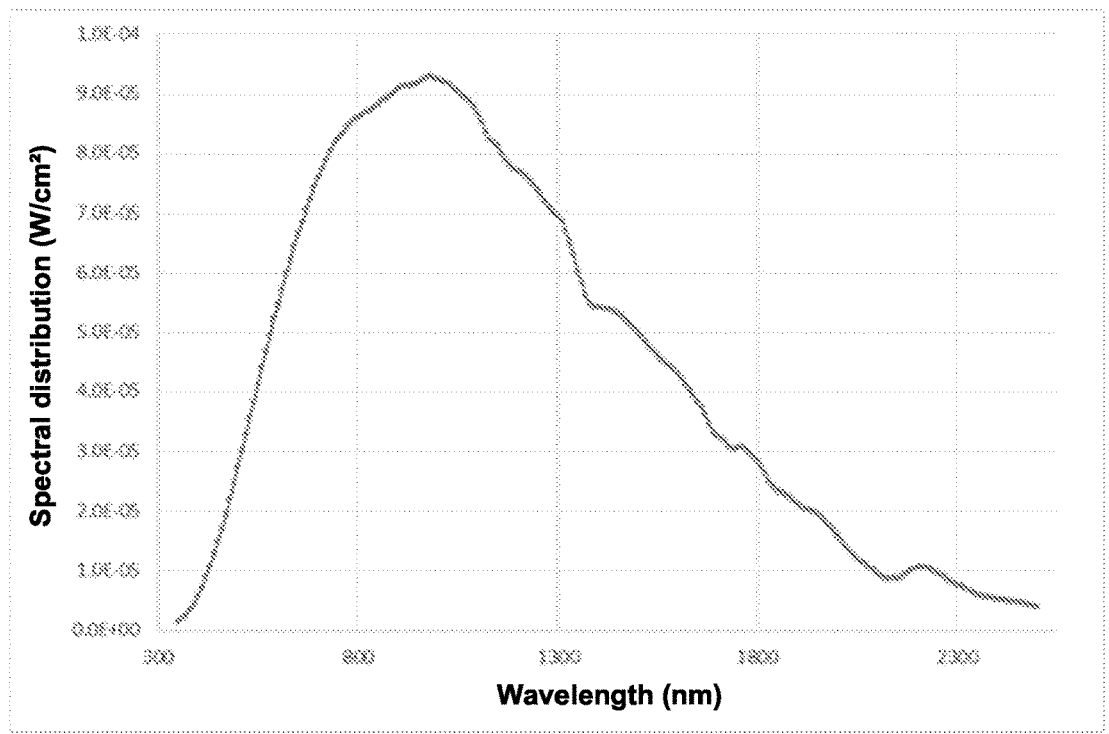

Thus, the use of a fibered source 23 and of optical fibers 28, 29, 30, 16 adapted to the transmission mode of fibered source 23, enables to efficiently transmit a luminous flux with elements having a verry small bulk. Comparatively, FIG. 12 illustrates luminous flux L12 at the output of the integrating sphere 102 of FIG. 1*a*; it can be observed that this luminous flux has a spectral width much less accurate than the luminous flux transmitted by the association of fibered source 23 and of optical fibers 28, 29, 30, 16.

Figures 1A, 1B:
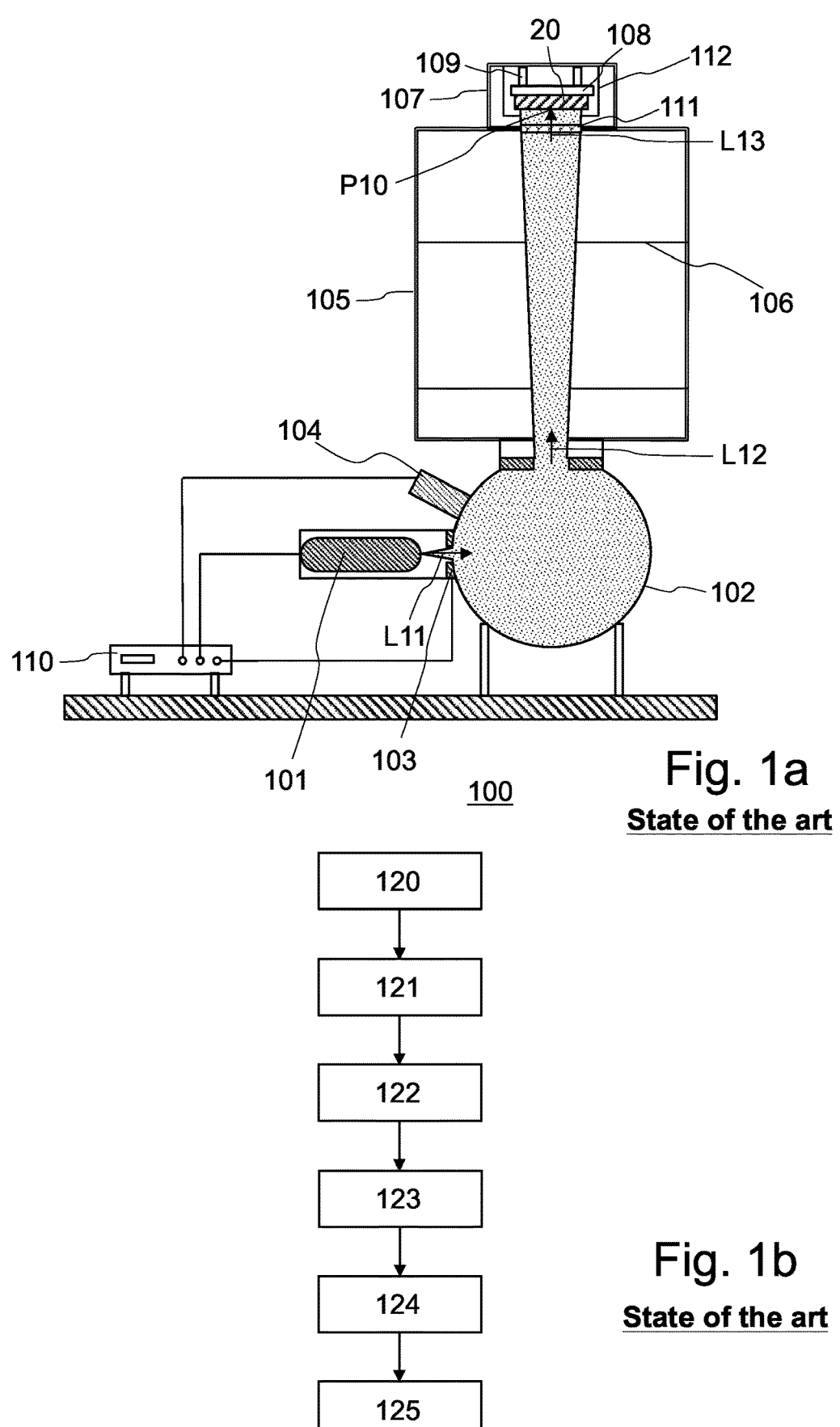
Figure 2A:
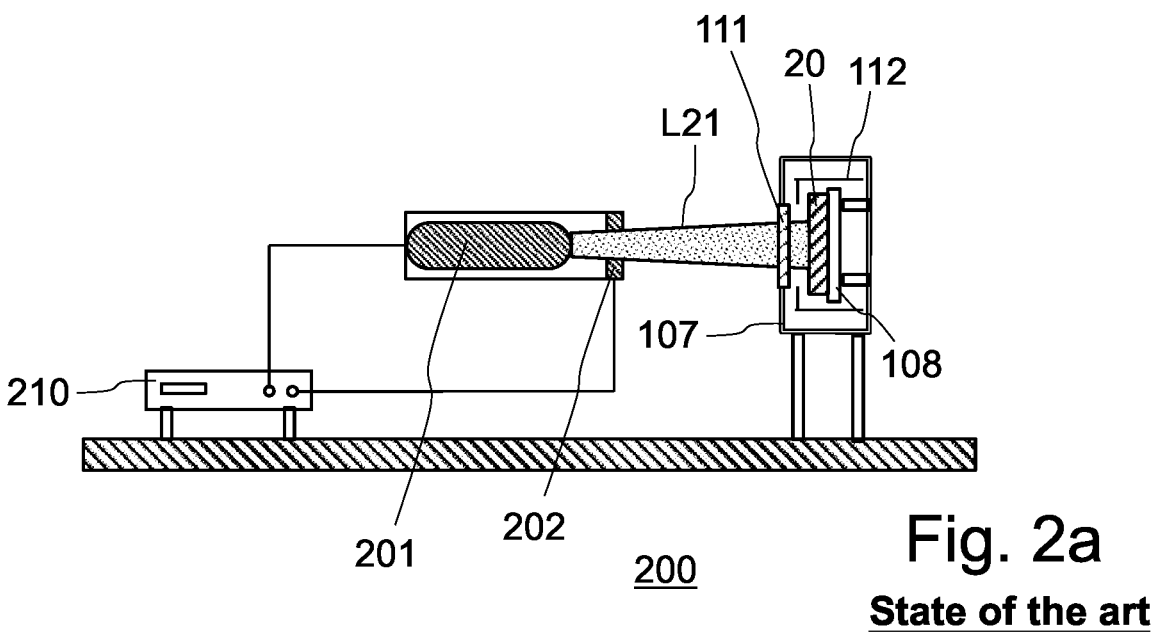
FIG. 2a is a simplified representation of a remanence test bench of the state of the art.
Figure 2B:
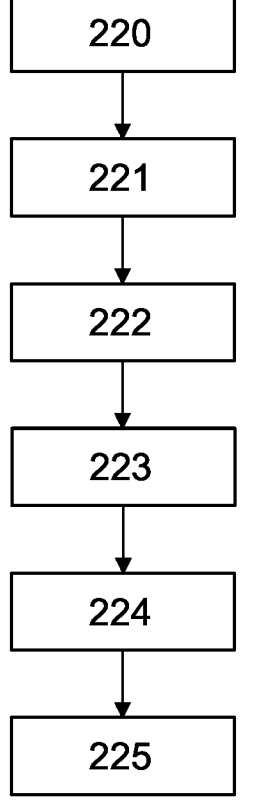
Figure 3A:
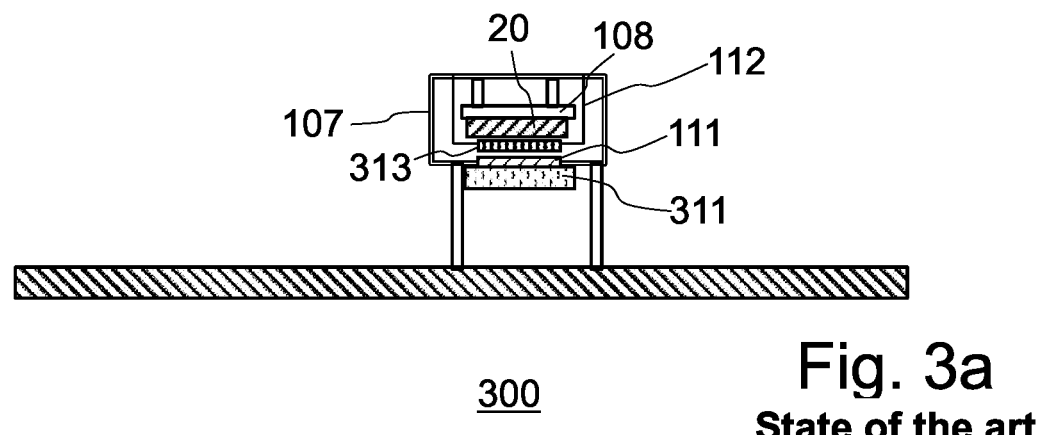
FIG. 3a is a simplified representation of a dark current test bench of the state of the art.
Figure 3B:
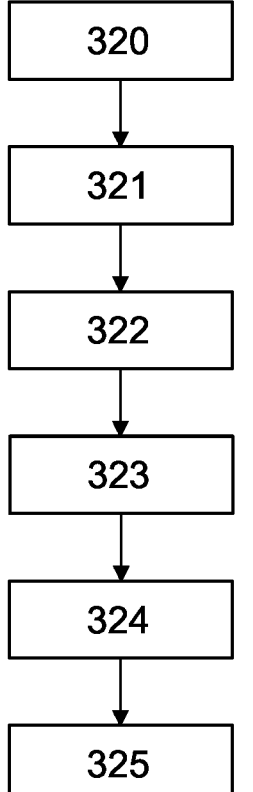
Figures 4A, 4B:
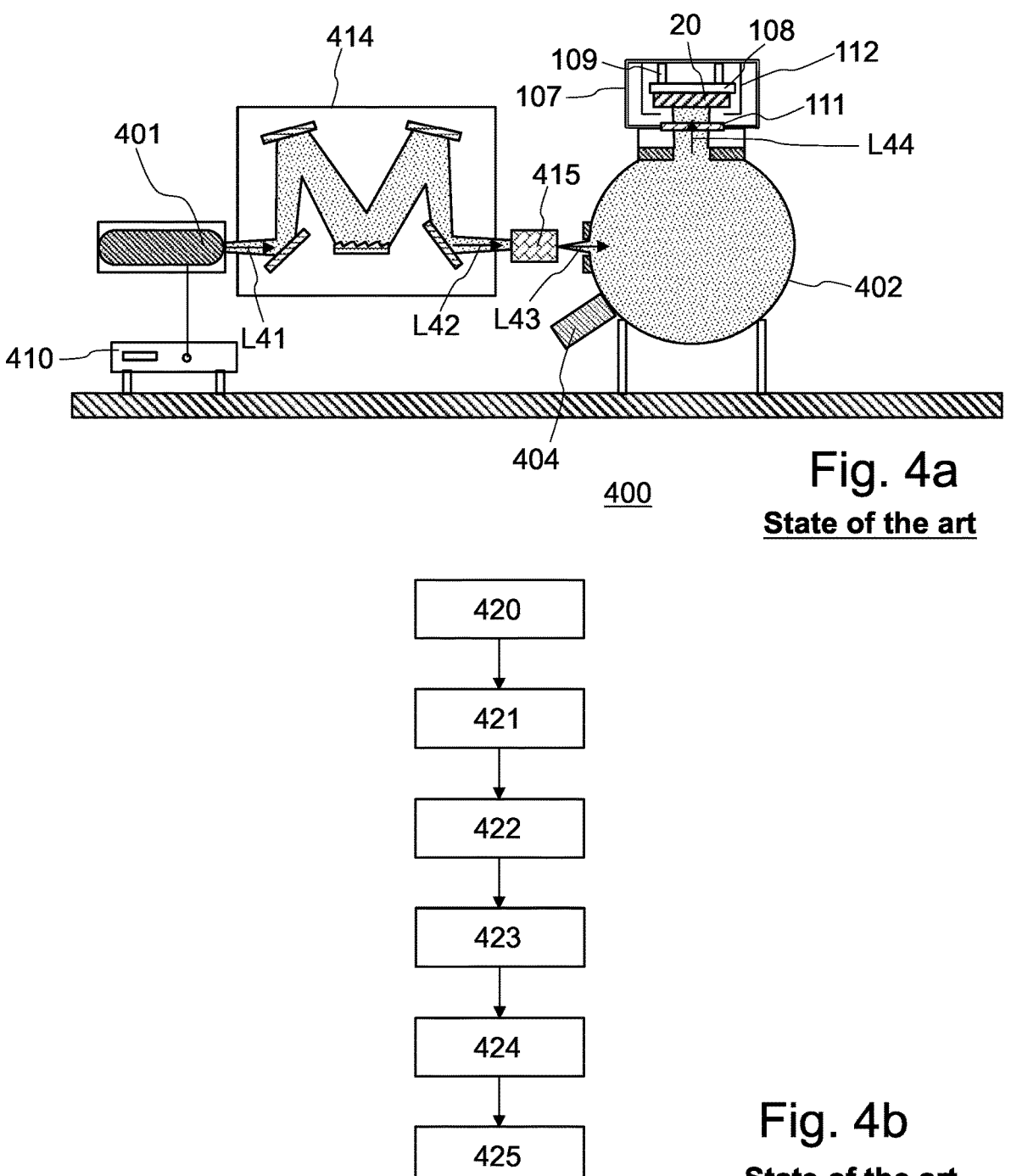
Figure 13:
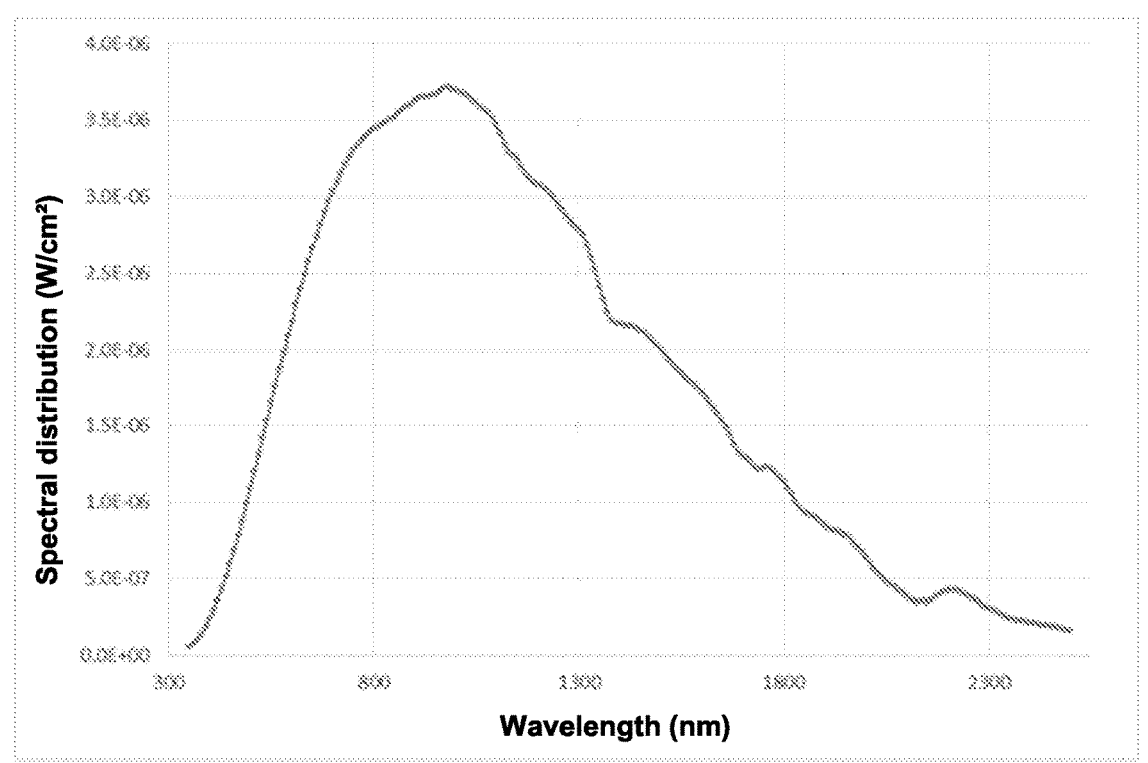
Figure 14:
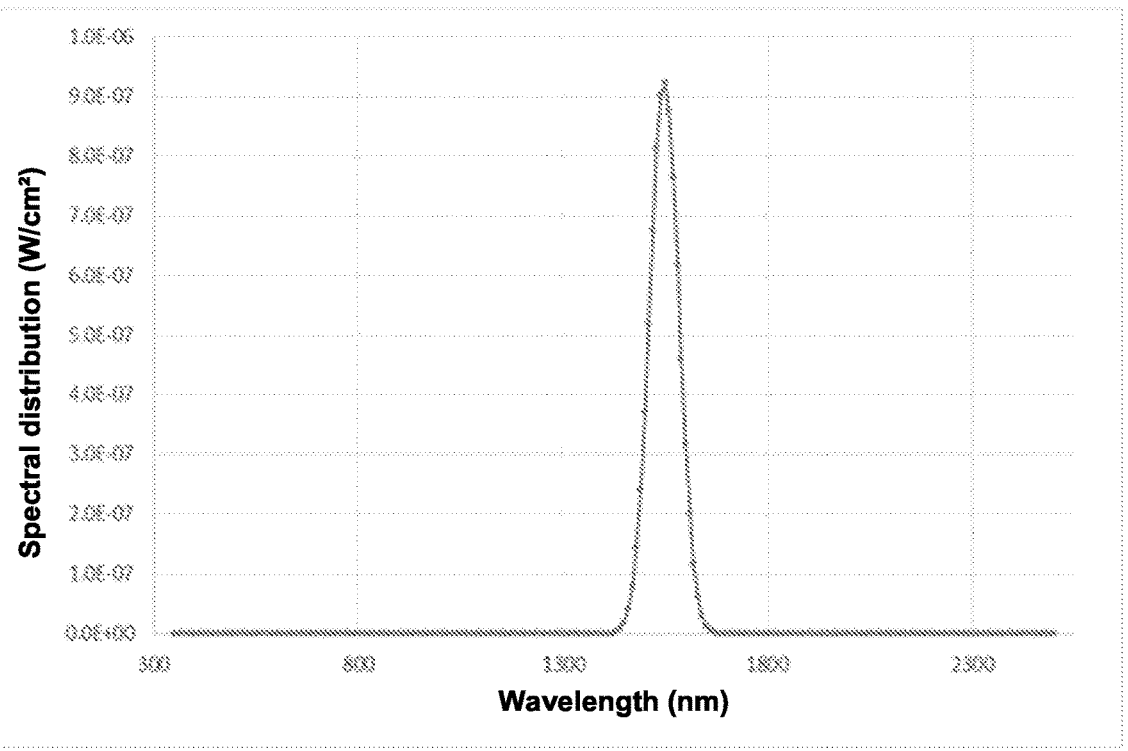

Similarly, in the example of FIG. 1*a*, the luminous flux L13 at the input of the cryostat is illustrated in FIG. 13 and still has a significant spectral width. Only after having passed through the filter of screen 112 is the spectral width of the luminous flux of the state of the art decreased. Thus, as illustrated in FIG. 14, the luminous flux transmitted to detector 20 in the radiometric test bench of the state of the art also has a spectral width close to that of the invention but with a low optical power level.

Thereby, with lower-cost, less bulky, and less power-intensive element, the invention enables to generate a more powerful optical flux, as accurate as that transmitted in the radiometric test bench of the state of the art, such as illustrated in FIG. 1*a*.

Further, the possibility to change the luminous flux generation module without having to displace cryostat 17 enables to significantly improve the measurement speed with respect to the use of a plurality of successive benches of the state of the art.

In addition to the module 50 illustrated in FIG. 6 to perform a radiometric measurement, it is also possible to connect a module 51 to perform a remanence measurement.

This module 51 comprises a fibered source 33, for example a source identical to the source 23 of module 50, or a source having distinct properties. This fibered source 33 is connected to a first feeder optical fiber, itself connected to an optical shutter 35. Optical shutter 35 is connected to a second feeder optical fiber 29, itself connected to optical splitter 25. This optical splitter 25 comprises two outputs:

a first output connected to a third feeder optical fiber 30, itself connected on the second end 22 of optical fiber 16; and a second output connected to a fourth feeder optical fiber 31 connected to a reference detector 34.

Controller 11 enables to control the luminous flux emitted by the fibered source and optical shutter 35 to measure the remanence and pre-remanence effects by comparing the images acquired by detector 20 and by reference detector 34.

To obtain the dark current measurement, it is not necessary to use a dedicated luminous flux generation module, and it is sufficient to turn off the fibered source 23 or 33 of luminous flux generation module 50 or 51.

Indeed, without a luminous flux generated by fibered source 23 or 33, the wavelengths of the luminous fluxes of the ambient lights cannot be coupled with the optical fiber so that it is possible to efficiently measure the dark current.

Figure 8:
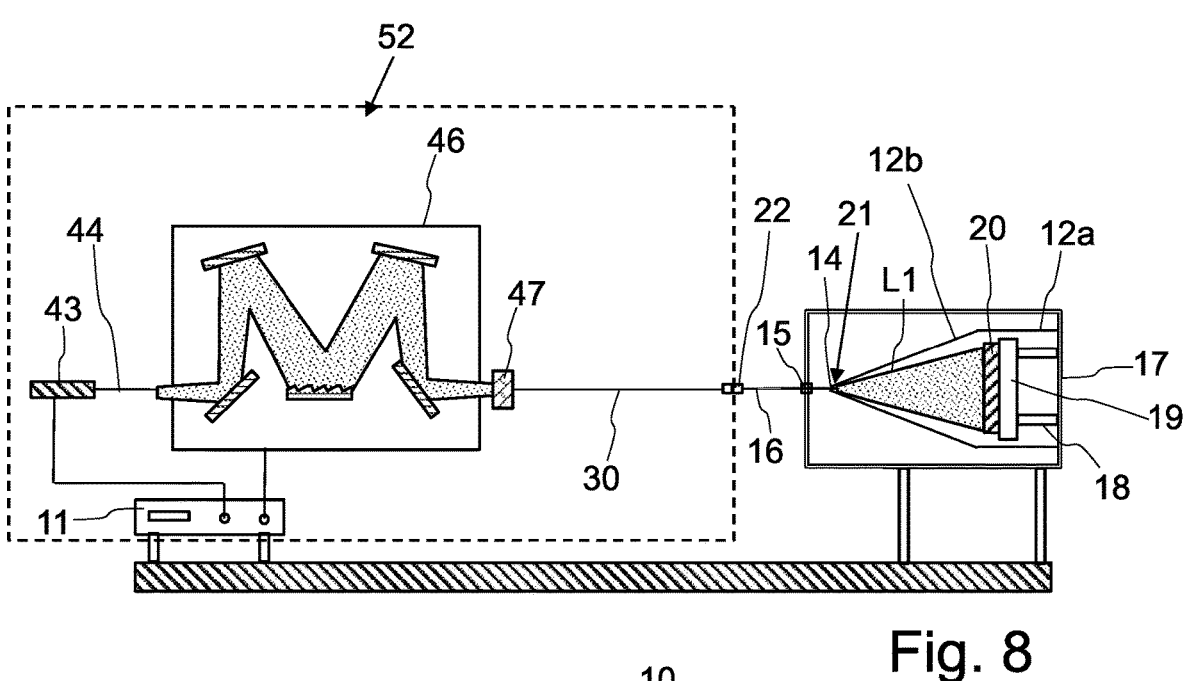
FIG. 8 illustrates a configuration of the measurement device of FIG. 5 to obtain a spectral measurement.

As concerns the spectral response, a luminous flux generation module 52 may be connected on the second end 22 of optical fiber 16, as illustrated in FIG. 8. For example, this module 52 comprises a fibered source 43 connected to a first feeder optical fiber 44. This first feeder optical fiber 44 is also connected to a diffraction grating 46. The output of diffraction grating 46 is projected onto a filter 47 enabling to limit the diffraction orders of the luminous flux at the output of diffraction grating 46. This filtered luminous flux is integrated in a second feeder optical fiber 30. This second feeder optical fiber 30 is connected on the second end 22 of optical fiber 16.

Thus, a controller 11 can control the parameters of diffraction grating 46 to perform a spectral response measurement.

To perform the spectral response measurement, the wavelength of the luminous flux at the output of fiber 16 has to be varied and the ratio of the response of detector 20 to the response of a reference detector having a known spectral response has to be measured.

For this purpose, the reference detector may be positioned in the cryostat next to detector 20 to directly obtain the ratio of the response of detector 20 to the response of the reference detector.

As a variant, the reference detector may be positioned in a second cryostat having properties analog to those of the cryostat 17 of detector 20, this second cryostat also integrating an optical fiber 16 capable of receiving the luminous flux. After or before performing the measurements on detector 20, optical fiber 30 can thus be connected to the optical fiber of the second cryostat to perform the same measurements on the reference detector. The ratio of the response of detector 20 to the response of the reference detector is thus calculated at the end of two measurement phases, on detector 20 and on the reference detector.

Figure 15:
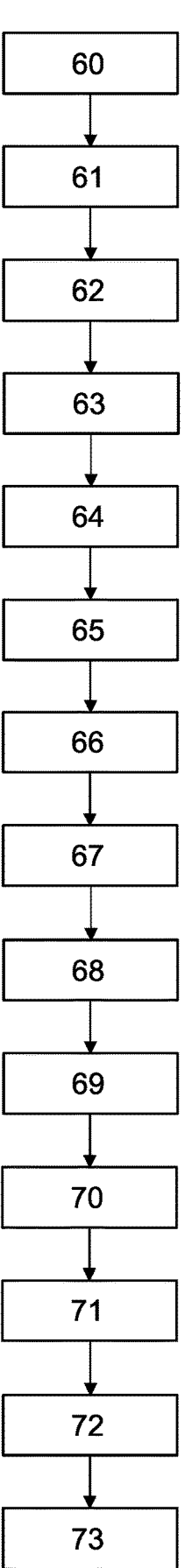
FIG. 15 illustrates the steps of implementation of a radiometric measurement, of a remanence measurement, of a dark current measurement, and of a spectral measurement according to an embodiment of the method of the invention.

As illustrated in FIG. 15, the method of measuring the performance of an optical detector 20 may comprise a first step 60 of assembly of detector 20 on the holder 19 of the cryostat. A second step 61 comprise placing under vacuum the cryostat to reach the desired operating vacuum level of detector 20. The means for cooling cryostat 17 are then implemented at a step 62 and, at the same time, a first luminous flux generation module may be connected on the second end 22 of optical fiber 16, at a step 63. When a luminous flux generation module 50 to 52 is connected on the second end 22 of optical fiber 16, measurements of the performance of detector 20 can be performed, at a step 64.

Then, when all the measurements of the performance of detector 20 are performed by means of the connected module 50 to 52, module 50 to 52 can be disconnected, at a step 65. During this disconnection of module 50 to 52, it is not necessary to modify the temperature or the vacuum level of cryostat 17, so that a second module 50 to 52 can then be connected to optical fiber 16, at a step 66. Measurements of the performance of detector 20 can then be performed, at a step 67, based on the new module 50 to 52 connected to optical fiber 16.

A plurality of modules 50 to 52 can thus be successively connected to optical fiber 16 without having to modify the temperature or the vacuum level of cryostat 17.

For example, one may have the following succession of steps:

step 63: connection of generation module 50 enabling to perform a radiometric measurement;

step 64: radiometric measurement of the performance of detector 20;

step 65: disconnection of module 50;

step 66: connection of module 51 to measure the remanence;

step 67: measurement of the remanence of the detector;

step 68: measurement of the dark current of the detector by turning off the fibered source 33 of module 51.

When the remanence and dark current measurements are carried out by module 51, one then has the following succession of steps:

step 69: disconnection of module 51;

step 70: connection of module 52 enabling to measure the spectral response;

step 71: measurement of the spectral response of detector 20.

Whatever the number of modules 50 to 52 connected to optical fiber 16 to characterize detector 20, the method ends with a step 72 of heating of cryostat 17 and a step 73 of placing back at ambient pressure of cryostat 17 and of disassembly of detector 20.

The invention thus enables to obtain a device 10 for measuring the performance of an optical detector 20 having a lower bulk and limited cost with respect to the use of multiples test benches. Indeed, the invention enables to interchange the luminous flux generation modules to couple them to an optical fiber partially integrated in cryostat 17. This possibility of coupling of different modules 50 to 52 on optical fiber 16 enables to improve the speed and the duration necessary to perform all the measurements.

For example, when it is desired to characterize a detector 20 by performing a radiometric measurement, a remanence measurement, a dark current measurement, and a spectral response measurement, the invention enables to obtain a division by a factor in the range from 5 to 10 of the measurement time.

Further, it has been observed that the accuracy of the obtained measurements also has a higher performance than that obtained in the state of the art. Indeed, the repeatability rate of the measurements has been estimated to 0.1% with devices of the state of the art and the invention has enabled to obtain a repeatability rate of 0.01%. This repeatability rate is calculated by repeating a large number of times similar measurements and by calculating the divergence between these measurements.

The invention claimed is:

1. A device for measuring the performance of an optical detector comprising:
    a cryostat comprising a vacuum pump configured to place the cryostat under vacuum and a cryogenic cooler configured to cool the cryostat;
    a holder capable of receiving the detector, secured to the inside of the cryostat;
    means for measuring the performance of the detector; and
    a screen arranged around the holder capable of limiting radiation likely to reach the holder in a wavelength range of the detector;
    wherein the measurement device also comprises:
    a single-mode optical fiber in the wavelength range of the detector; the single-mode optical fiber being inserted in an opening of the cryostat and comprising:
        a first end secured to an opening of the screen, to project a luminous flux onto all or part of the detector; and
        a second end, external to the cryostat, intended to receive the luminous flux; and
    at least two modules for generating the luminous flux that incorporate a fibered source capable of generating the luminous flux in the second end of the single-mode optical fiber;
    the means for measuring the performance of the detector being capable of measuring said performance according to the luminous flux received on the second end; where a plurality of distinct measurements may be performed by interchanging a one of the two modules connected on the second end of the single-mode optical fiber.

2. The device for measuring the performance of an optical detector according to claim 1, wherein the fibered source is formed of a light-emitting diode, of a supercontinuum source, or of a laser.

3. The device for measuring the performance of an optical detector according to claim 1, wherein the single-mode optical fiber is formed with a core made of fluorinated glass, of chalcogenide glass, or of polycrystalline material.

4. The device for measuring the performance of an optical detector according to claim 1, wherein one of the luminous flux generation modules, intended to be connected on the second end of the single-mode optical fiber to perform a radiometric measurement, comprises:
    the fibered source intended to generate the luminous flux inside of a first feeder optical fiber;
    an optical attenuator, capable of limiting the luminous flux, said attenuator being connected between the first feeder optical fiber and a second feeder optical fiber;
    an optical splitter, connected to the second feeder optical fiber, capable of splitting the luminous flux of the second feeder optical fiber onto a third and a fourth feeder optical fiber; the third feeder optical fiber being connected on the second end of the single-mode optical fiber inserted in the cryostat; and
    a reference detector, connected on the fourth feeder optical fiber, and capable of measuring the luminous flux at an output of the optical splitter in order to control a power of the fibered source and the optical attenuation to obtain an anticipated measurement luminous power.

5. The device for measuring the performance of an optical detector according to claim 1, wherein one of the luminous flux generation modules, intended to be connected on the second end of the single-mode optical fiber to perform a remanence measurement, comprises:
    the fibered source intended to generate the luminous flux inside of a first feeder optical fiber;
    an optical shutter, capable of blocking the luminous flux, connected between the first feeder optical fiber and a second feeder optical fiber;
    an optical splitter, connected to the second feeder optical fiber, capable of splitting the luminous flux of the second feeder optical fiber onto a third and a fourth feeder optical fiber; the third feeder optical fiber being connected on the second end of the single-mode optical fiber inserted in the cryostat; and
    a reference detector, connected to the fourth feeder optical fiber, capable of controlling the luminous flux at an output of the optical splitter.

6. The device for measuring the performance of an optical detector according to claim 5, wherein the luminous flux generation module, intended to be connected on the second end of the single-mode optical fiber to perform the remanence measurement, is also implemented to perform a dark current measurement by cutting off an electric power supply of the fibered source.

7. The device for measuring the performance of an optical detector according to claim 1, wherein the single-mode optical fiber has a normalized frequency in the range from 1.2 to 3.8 in the wavelength range of the detector interest.

8. The device for measuring the performance of an optical detector according to claim 1, wherein one of the luminous flux generation modules, intended to be connected on the second end of the single-mode optical fiber to perform a spectral response measurement, comprises:
    the fibered source intended to generate the luminous flux inside of a first feeder optical fiber;
    a diffraction grating connected to the first feeder optical fiber;
    a filter connected at an output of the diffraction grating; and
    a second feeder optical fiber connected at an output of a second filter.

9. A method of measuring the performance of an optical detector by means of a device according to claim 1, said method comprising the following steps:

assembly of the detector to the holder of the cryostat;

placing under vacuum of the cryostat to reach a desired operating vacuum level of the detector;

cooling of the cryostat to reach a desired operating temperature of the detector;

connection of a first luminous flux generation module on the second end of the single-mode optical fiber;

measurement of the performance of the detector;

disconnection of the first luminous flux generation module from the second end of the single-mode optical fiber;

connection of a second luminous flux generation module on the second end of the single-mode optical fiber;

measurement of the performance of the detector;

heating of the cryostat to reach room temperature; and placing back under ambient pressure of the cryostat and disassembly of the detector.

10. The method of measuring the performance of an optical detector according to claim 9, said method comprising the following steps:

connection of the first luminous flux generation module to perform a radiometric measurement on the second end of the single-mode optical fiber;

radiometric measurement of the detector;

disconnection of the first luminous flux generation module from the second end of the single-mode optical fiber;

connection of the second luminous flux generation module to perform a remanence measurement on the second end of the single-mode optical fiber;

measurement of the remanence of the detector;

measurement of the dark current of the detector;

disconnection of the second luminous flux generation module from the second end of the single-mode optical fiber;

connection of a third luminous flux generation module to perform a spectral response measurement on the second end of the single-mode optical fiber; and measurement of the spectral response of the detector.

* * * * *